United States Patent
Bull et al.

(10) Patent No.: US 11,615,480 B2
(45) Date of Patent: *Mar. 28, 2023

(54) SYSTEMS AND METHODS FOR MULTI-PURSE DEBIT CARD

(71) Applicant: Alegeus Technologies, LLC, Waltham, MA (US)

(72) Inventors: John Bull, Waltham, MA (US); Chris Rodkey, Waltham, MA (US)

(73) Assignee: Alegeus Technologies, LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,159

(22) Filed: Feb. 4, 2022

(65) Prior Publication Data

US 2022/0156847 A1  May 19, 2022

Related U.S. Application Data

(63) Continuation of application No. 14/805,522, filed on Jul. 22, 2015, now Pat. No. 11,244,405.

(51) Int. Cl.
  *G06Q 40/00* (2012.01)
  *G06Q 20/34* (2012.01)
  *G06Q 20/12* (2012.01)
  *G06Q 40/10* (2023.01)

(52) U.S. Cl.
  CPC ............. *G06Q 40/10* (2013.01); *G06Q 20/12* (2013.01); *G06Q 20/3572* (2013.01)

(58) Field of Classification Search
  None
  See application file for complete search history.

(56) References Cited

U.S. PATENT DOCUMENTS

| | | |
|---|---|---|
| 6,000,608 A | 12/1999 | Dorf |
| 6,816,090 B2 | 11/2004 | Teckchandani et al. |
| 6,880,079 B2 | 4/2005 | Kefford et al. |
| 6,985,720 B2 | 1/2006 | Qu et al. |

(Continued)

OTHER PUBLICATIONS

Final Office Action on U.S. Appl. No. 14/805,522 dated Apr. 15, 2020.

(Continued)

*Primary Examiner* — Jason M. Borlinghaus
(74) *Attorney, Agent, or Firm* — Foley & Lardner LLP

(57) ABSTRACT

The present disclosure is directed to conducting electronic transactions via a computer network. A server receives data packets carrying data identifying a merchant category, an electronic account maintained and configured on the server, and a first monetary amount of a first electronic transaction. A first device generates the data packets at the merchant to conduct the electronic transaction. A policy engine selects a first purse of a plurality of purses allocated to the electronic account based on a policy applied to the data. The first purse may be configured as a benefits purse. The server obtains the first monetary amount of the electronic transaction from the first purse. The policy engine applies a second policy to the data to determine a reimbursement amount based on the first monetary amount of the transaction, and electronically provides the reimbursement amount to a different second purse of the electronic account.

20 Claims, 6 Drawing Sheets

(56) References Cited

U.S. PATENT DOCUMENTS

| | | |
|---|---|---|
| 7,116,985 B2 | 10/2006 | Wilson et al. |
| 7,151,932 B2 | 12/2006 | Major |
| 2005/0240473 A1 | 10/2005 | Ayers et al. |
| 2007/0203757 A1 | 8/2007 | Dibiasi et al. |
| 2012/0253852 A1 | 10/2012 | Pourfallah et al. |
| 2014/0297307 A1* | 10/2014 | Pletz ............... G06Q 10/10 705/2 |

OTHER PUBLICATIONS

Final Office Action on U.S. Appl. No. 14/805,522 dated Jan. 10, 2019.
Final Office Action on U.S. Appl. No. 14/805,522 dated Mar. 16, 2021.
Non-Final Office Action on U.S. Appl. No. 14/805,522 dated Jun. 13, 2018.
Non-Final Office Action on U.S. Appl. No. 14/805,522 dated Sep. 16, 2020.
Non-Final Office Action on U.S. Appl. No. 14/805,522 dated Sep. 30, 2019.
Notice of Allowance on U.S. Appl. No. 14/805,522 dated Oct. 6, 2021.

* cited by examiner

SYSTEMS AND METHODS FOR MULTI-PURSE DEBIT CARD

CROSS-REFERENCES TO RELATED APPLICATIONS

This application claims the benefit of priority under 35 U.S.C. § 120 as a continuation of U.S. patent application Ser. No. 14/805,522, filed Jul. 22, 2015, which is hereby incorporated herein by reference in its entirety.

FIELD OF THE DISCLOSURE

The present solution is generally directed to conducting electronic transactions using a multi-purse card. In particular, the present solution can provide a credit in real-time to a purse of a multi-purse card responsive to approval of a claim made using a different purse of the multi-purse card.

BACKGROUND OF THE DISCLOSURE

Companies or health insurance provides may establish flexible spending accounts for individuals such as employees or subscribers, which may provide a tax advantage. The individual may transfer or allocate funds to the flexible spending account. The individuals may purchase qualifying items at a merchant using funds in their flexible spending account in order take advantage of tax savings. As individuals increasingly utilize flexible spending accounts to make purchases at various merchants' locations, it may be challenging for a provider or administrator of the flexible spending account to efficiently conduct the transactions in order to improve aspects or benefits associated with the flexible spending account.

BRIEF SUMMARY OF THE DISCLOSURE

Systems and methods of the present solution are directed to conducting electronic transactions via a computer network. In some embodiments, the present solution automates reimbursement of a flexible spending account ("FSA"), Healthcare Savings Account ("HSA"), Dependent Care Account ("DCA"), Transport Account (e.g., for parking or monthly passes) or other benefit account reimbursements to a benefits debit card linked to a multi-purse electronic account maintained and configured on a server. When participants submit claims for reimbursement from their FSA, HRA or other benefit account, the present solution provides a real time credit to their multi-purse debit card when the claim is approved for reimbursement. The present solutions provides a notification via electronic mail or electronic messaging explaining that the reimbursed amount is now available for unrestricted spending at any merchant. The present solution uses one or more policy or logic engines to authorize transactions based on a merchant category code to determine from which of the accounts on the electronic multi-purse card, commonly called purses, are eligible to pay for the transaction.

A user or participant can make the transaction at an entity such as a merchant, pharmacy, retail store, medical supply store, or other entity that provides goods or services that, in some cases, may be deemed to be qualified expenses in accordance with the tax benefit account. The transaction can occur via a point-of-sale terminal or device located at the merchant. The point-of-sale terminal can be configured to receive financial transaction information from the user (e.g., via a card swipe) and communicate with one or more servers or databases to authenticate the financial transaction information, identify a corresponding tax benefit account of the user, and initiate or facilitate the transfer of funds from the tax benefit account to the entity. The transaction can be associated with information such as a time stamp, entity or merchant identifier, merchant category, electronic account, and transaction amount. This information can be provided in real-time to a server that facilitates conducting the transaction.

For example, if the participant has $100 in their FSA which is setup for Medical, Rx, Vision and Dental purchases, and the participant swipes their card at a vision provider for $75, the system makes a determination based on a policy to select an FSA from which to detect funds. If the card is swiped at a restaurant and the participant has a Reimbursement Purse on the card, the system may deduct funds from a reimbursement purse. If the participant has a transaction that exceeds the FSA for a qualified expense, the system may use the FSA funds plus an amount from the reimbursement purse. Participants can text a code such as "BAL" to the present solution to receive a current balance in one or more accounts/purses, including the reimbursement purse, or call to obtain balances for all accounts through an interactive voice response, as well as view the balance through a mobile application or online portal.

At least one aspect of the present solution is directed to a method of conducting electronic transactions via a computer network. The method can include a communications interface executing on one or more processors of a server via a network protocol receiving a first one or more data packets. The first one or more data packets may be generated by a first device at a first merchant to conduct a first electronic transaction at the first merchant. The first one or more data packets may include first header information and first payload information carrying data. The first one or more data packets may carry data identifying a first merchant category of the first merchant, an electronic account maintained and configured on the server, and a first monetary amount of the first electronic transaction. The method includes a policy engine executing on the one or more processors of the server selecting a first purse of a plurality of purses allocated to the electronic account maintained by the server based on a first policy applied to the data. The first purse may be configured as a purse with funds exempt from payroll tax deductions to be used to conduct approved transactions. The method includes the server obtaining the first monetary amount of the first electronic transaction from the first purse of the electronic account. The method includes the policy engine applying a second policy to the data to determine a reimbursement amount based on the first monetary amount of the transaction. The method includes the server electronically providing, via the computer network, the reimbursement amount to a second purse of the electronic account. The second purse may be different from the first purse.

In some embodiments, the server selects the first purse based on the first policy applied to the first merchant category. In some embodiments, the server provides a real-time notification of the reimbursement amount responsive to transferring the reimbursement amount to the second purse of the electronic account. In some embodiments, the policy engine determines that the first purse of the electronic purse is configured for prescription purchases. The server may select the first purse responsive to determining that the first merchant is a prescription provider based on the first merchant category.

In some embodiments, the server receives a second one or more data packets generated by a second device at a second merchant to conduct a second electronic transaction at the second merchant. The second one or more data packets may carry second data indicating a second merchant category of the second merchant, the electronic account, and a second monetary amount of the second electronic transaction. The electronic policy engine may use the first policy to select the second purse of the electronic account based on the second merchant category. The server may provide an indication to use the second account for at least a portion of the secondary monetary amount. In some embodiments, the server may select the first account for a first portion of the second monetary amount based on the second merchant category matching the first account. The server may select the second account for a second portion of the second monetary amount based on an available balance in the first account being less than the second monetary amount of the second transaction.

In some embodiments, the server may select the second purse responsive to determining that the first purse is not configured for the second merchant category of the second merchant. In some embodiments, the server may map, using the first policy, the first merchant to the first purse based on the first merchant category and a first configuration of the first purse. The server may use the first policy to map the second merchant to the second purse based on the second merchant category and a second configuration of the second purse.

In some embodiments, the server may retrieve, from a policy repository stored in memory, the second policy using an identifier of the electronic account. In some embodiments, the server may access a data record in memory for the electronic account. The data record may include a first available amount and a first configuration for the first purse, and a second available amount and a second configuration for the second purse. The server may determine, based on the first available amount and the first configuration, to use the first purse for the first electronic transaction. The server may determine, based on the first available amount and the first configuration, not to use the second purse for the first electronic transaction. The server may determine, based on the first configuration, not to use the first purse for a second electronic transaction. The server may determine, based on the second available amount and the second configuration, to use the second purse for the second electronic transaction.

In some embodiments, the server may receive a request from a client device for information about the electronic account. The server may authenticate the request from the client device using credentials associated with the request. The server may access a data record in memory for the electronic account. The data record may include a first available amount for the first purse, and a second available amount for the second purse. The server may provide for display on the client device a report indicating the first available amount and the second available amount.

In some embodiments, the server may receive the request via a Short Message Service protocol from the client device. The client device may be a mobile telecommunications device. The server may provide the report via at least one of the Short Message Service protocol or an electronic mail protocol.

Another aspect of the present solution is directed to a system to conduct electronic transactions via a computer network. The system can include a server having one or more processors and a communication interface. The system can include a policy engine and a transaction engine. The communications interface receives, via a network protocol, a first one or more data packets generated by a first device at a first merchant to conduct a first electronic transaction at the first merchant. The first one or more data packets carry data identifying a first merchant category of the first merchant, an electronic account, and a first monetary amount of the first electronic transaction. The policy engine selects a first purse of a plurality of purses allocated to the electronic account maintained by the server based on a first policy applied to the data. The first purse can be configured as a purse with funds exempt from payroll tax deductions to be used to conduct approved transactions. The transaction engine obtains the first monetary amount of the first electronic transaction from the first purse of the electronic account. The policy engine applies a second policy to the data to determine a reimbursement amount based on the first monetary amount of the transaction. The transaction engine provides, via a network, the reimbursement amount to a second purse of the electronic account, the second purse different from the first purse.

In some embodiments, the server provides a real-time notification of the reimbursement amount responsive to transferring the reimbursement amount to the second purse of the electronic account. In some embodiments, the server determines that the first purse of the electronic purse is configured for prescription purchases. The server can select the first purse responsive to determining that the first merchant is a prescription provider based on the first merchant category.

In some embodiments, the server receives a second one or more data packets generated by a second device at a second merchant to conduct a second electronic transaction at the second merchant. The second one or more data packets carry second data indicating a second merchant category of the second merchant, the electronic account, and a second monetary amount of the second electronic transaction. The server can use the first policy to select the second purse of the electronic account based on the second merchant category. The server can provide an indication to use the second account for at least a portion of the secondary monetary amount.

In some embodiments, the server can select the second purse responsive to determining that the first purse is not configured for the second merchant category of the second merchant. In some embodiments, the server can use the first policy to map the first merchant to the first purse based on the first merchant category and a first configuration of the first purse. The server can use the first policy to map the second merchant to the second purse based on the second merchant category and a second configuration of the second purse.

In some embodiments, the server can access a data record in memory for the electronic account. The data record can include a first available amount and a first configuration for the first purse, and a second available amount and a second configuration for the second purse. The server can determine, based on the first available amount and the first configuration, to use the first purse for the first electronic transaction. The server can determine, based on the first available amount and the first configuration, not to use the second purse for the first electronic transaction. The server can determine, based on the first configuration, not to use the first purse for a second electronic transaction. The server can determine, based on the second available amount and the second configuration, to use the second purse for the second electronic transaction.

In some embodiments, the server can receive a request from a client device for information about the electronic account. The server can authenticate the request from the client device using credentials associated with the request.

The server can access a data record in memory for the electronic account. The data record can include a first available amount for the first purse, and a second available amount for the second purse. The server can provide, for display on the client device, a report indicating the first available amount and the second available amount.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
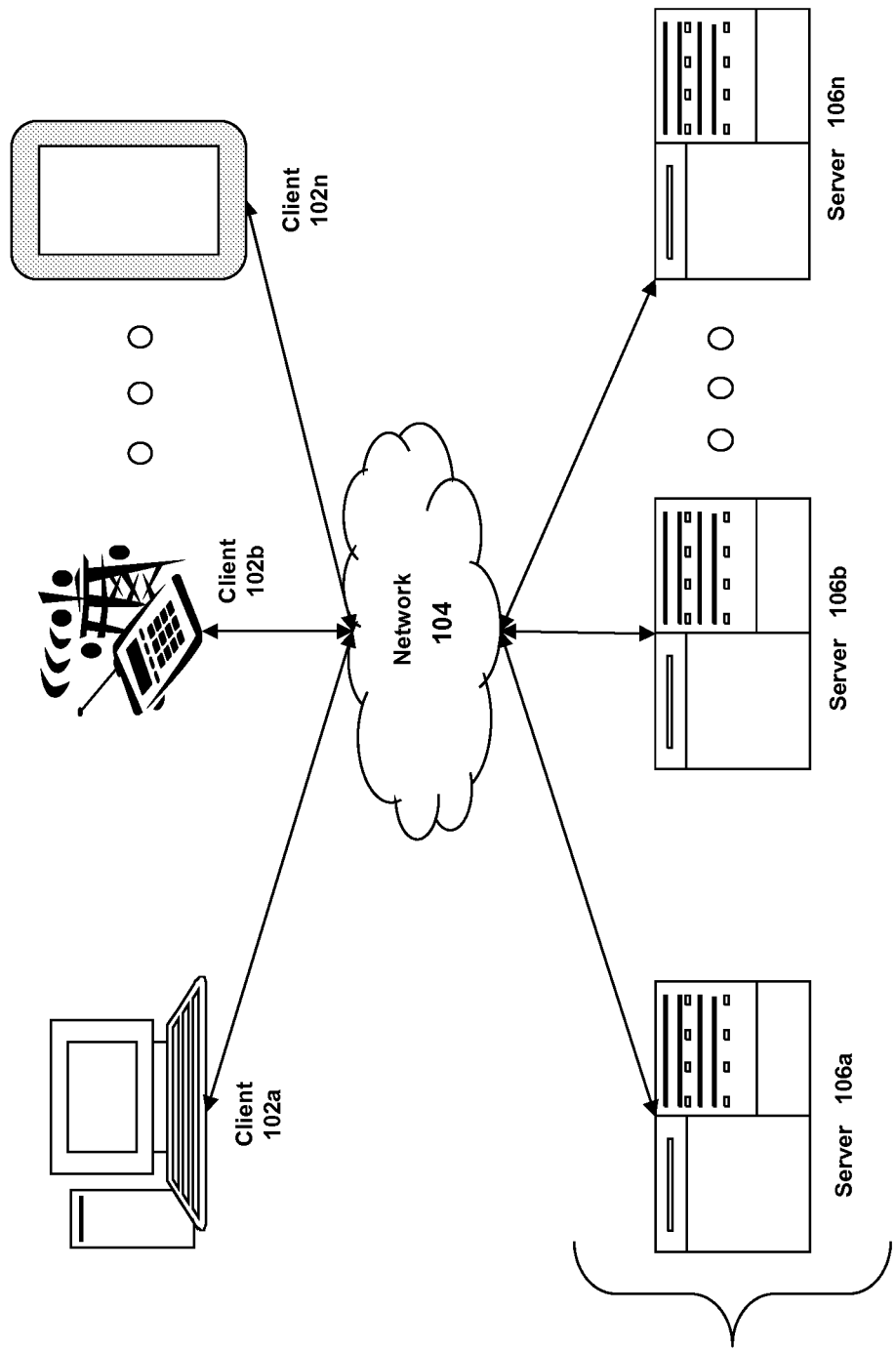
FIG. 1A is a block diagram depicting an embodiment of a network environment comprising client device in communication with server device.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for conducting electronic transactions.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
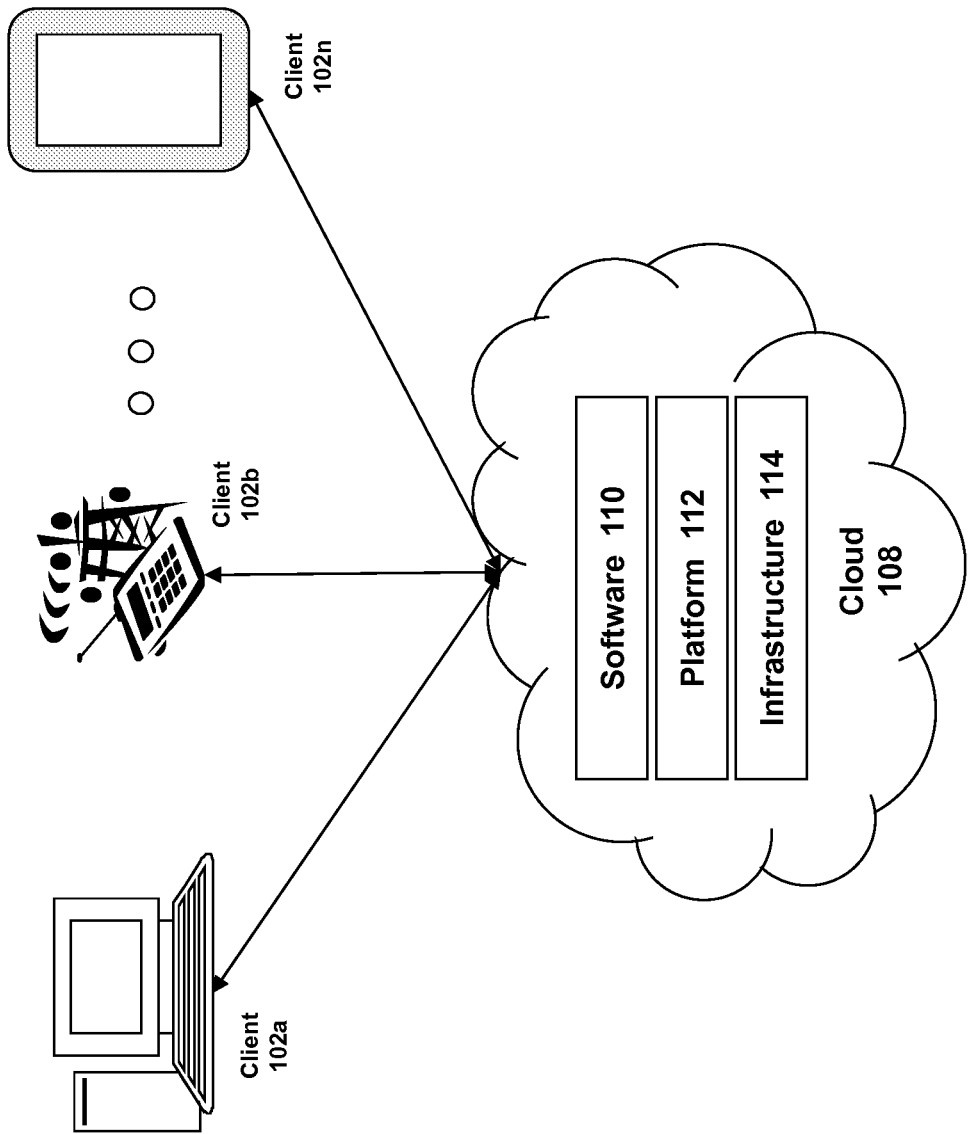
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
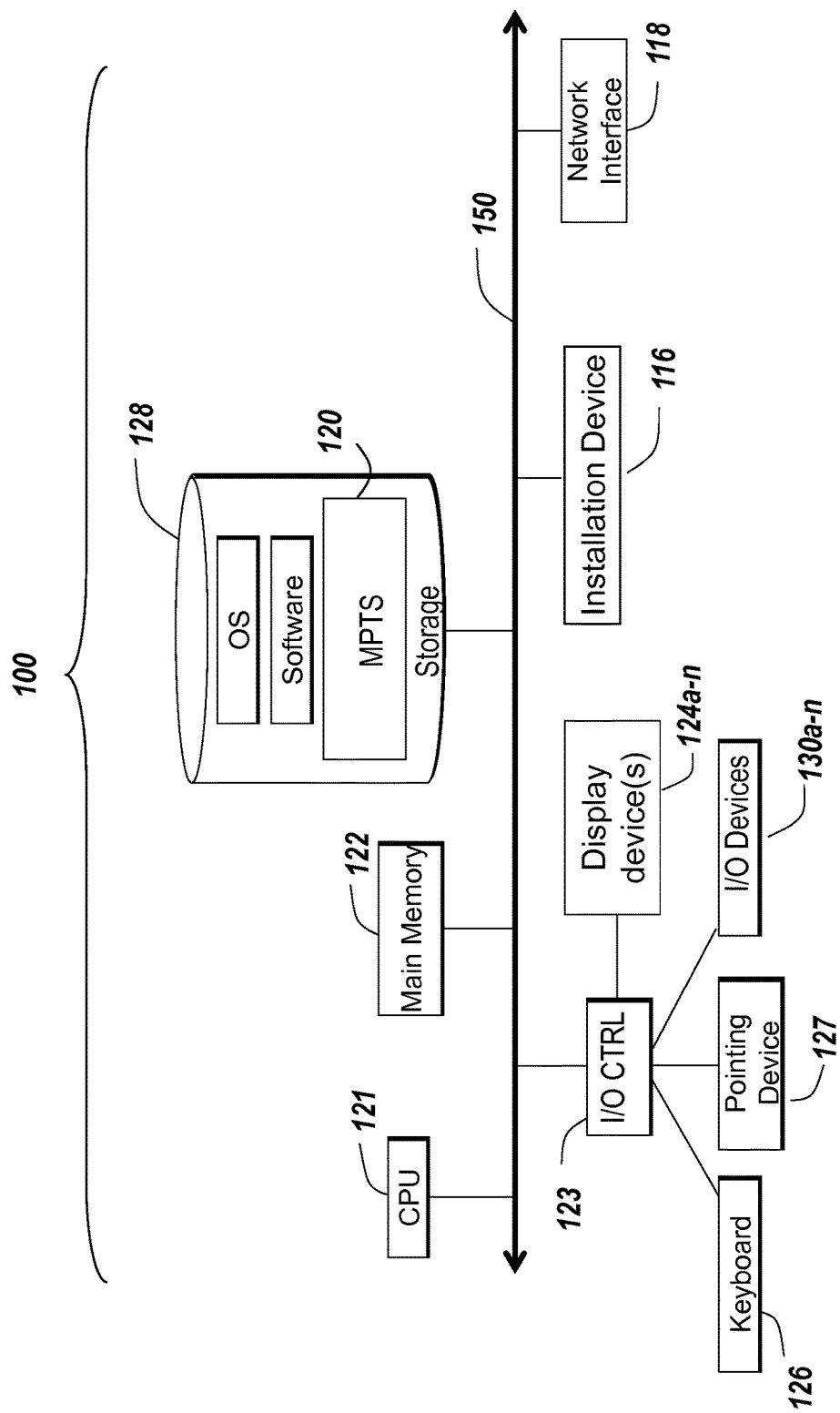
FIGS. 1C and 1D are block diagrams depicting embodiments of computing devices useful in connection with the methods and systems described herein.
Figure 1D:
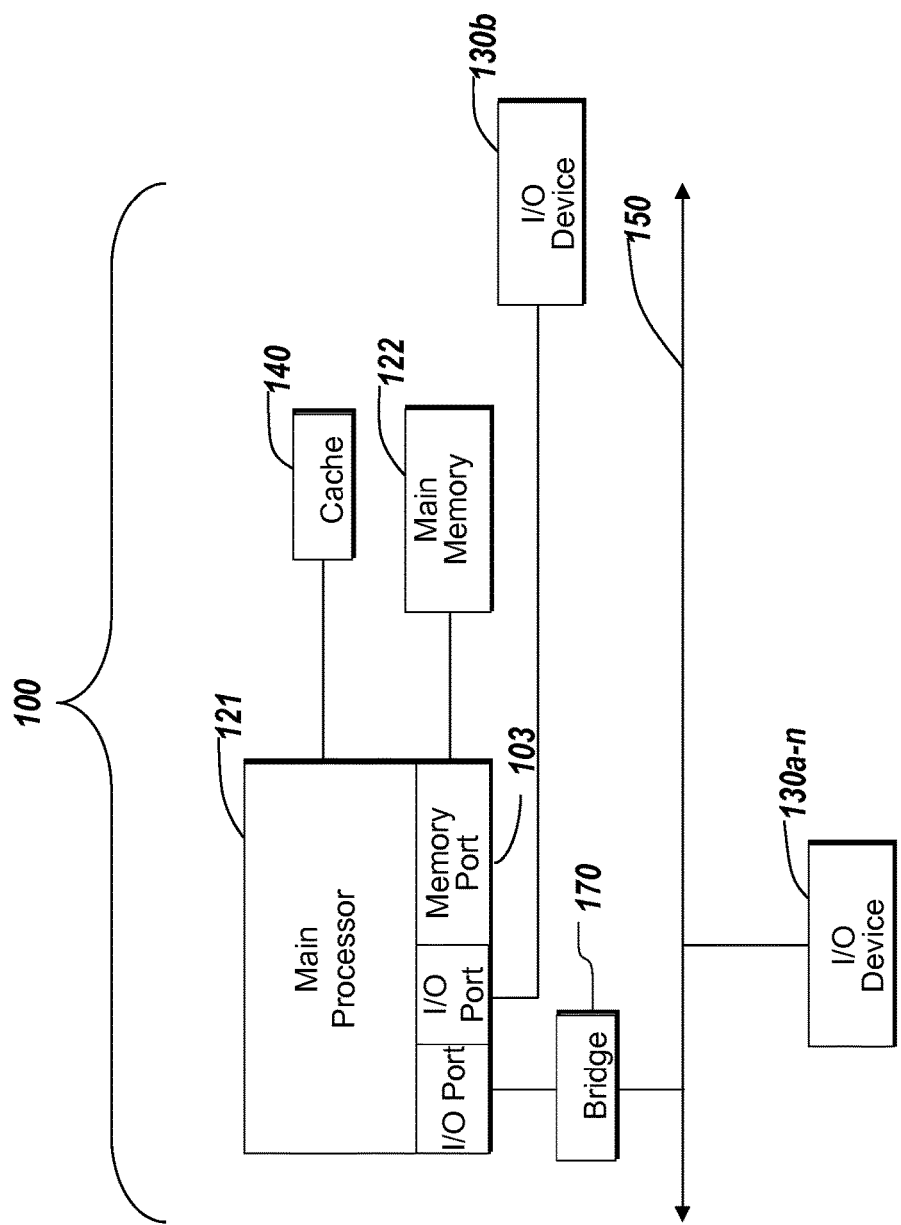

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a multi-purse transaction system (MPTS) 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the multi-purse transaction system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Multi-Purse Transaction System

Systems and methods of the present solution are directed to conducting electronic transactions via a computer network. Systems and methods of the present solution can use a multi-purse transaction system that maintains an electronic account having multiple purses. An electronic account may be maintained by a server and include a database in memory or a storage device. The electronic account may include sub structures or fields. The electronic account may include multiple purses that are configured with one or more rules, parameters, restrictions, or policies. For example, the electronic account may include a first purse that is configured as a benefits a purse. A purse configured for benefits may refer to a purse that is configured for transactions made using a tax benefit account such as a flexible spending account ("FSA"), Dependent Care Account ("DCA"), Transport Account (e.g., for parking or monthly passes). In some embodiments, the FSA, DCA, and Transport Account may be further separated into subpurses within the benefits purse of the electronic account. A flexible spending account, or flexible spending arrangement, can refer to a tax-advantaged financial account that can be set up through a cafeteria plan of an employer and used to set aside a portion of earnings to pay for qualified expenses as established in the cafeteria plan. Types of FSA can include medical expense FSA, health FSA, health savings account (HSA), health reimbursement account (HRA), health reimbursement plan (HRP), etc. Qualified expenses can include, for example, medical expenses, dependent care, dental expenses, vision expenses, parking, monthly passes, etc. An FSA may be tax-advantaged because funds deducted from an employee's account and transferred to the FSA is not subject to payroll taxes, resulting in payroll tax savings.

A user can make the transaction at an entity such as a merchant, pharmacy, retail store, medical supply store, or other entity that provides goods or services that are deemed to be qualified expenses in accordance with the tax benefit account or FSA. The transaction can occur via a point-of-sale terminal or device (e.g., checkout device, electronic point of sale device or other device that includes hardware and software to facilitate a transaction) configured to receive financial transaction information from the user (e.g., via a debit card, pin number, mobile payment device, near field communication-enabled device, mobile telecommunications device) and communicate with one or more servers or databases to authenticate the financial transaction information, identify a corresponding FSA of the user, and initiate or facilitate the transfer of funds from the FSA to the entity. The transaction can be associated with information such as an FSA account identifier, time stamp, entity identifier, and transaction amount. This information can be provided in real-time to a transaction repository.

When participants submit claims for reimbursement from their FSA, HRA or other benefit account, the present solution provides a real time credit to their multi-purse debit card when the claim is approved for reimbursement. The present solutions provides a notification via electronic mail or electronic messaging explaining that the reimbursed amount is now available for unrestricted spending at any merchant. The present solution uses one or more policy or logic engines to authorize transactions based on a merchant category code ("MCC") to determine from which of the accounts on the electronic multi-purse card, commonly called purses, are eligible to pay for the transaction.

For example, if the participant has $100 in their FSA which is setup for Medical, Rx, Vision and Dental purchases, and the participant swipes their card at a vision provider for $75, the system makes a determination based on a policy to select an FSA from which to detect funds. If the card is swiped at a restaurant and the participant has a Reimbursement Purse on the card, the system may deduct funds from a reimbursement purse. If the participant has a transaction that exceeds the FSA for a qualified expense, the system may use the FSA funds plus an amount from the reimbursement purse. Participants can text a code such as "BAL" to the present solution to receive a current balance in one or more accounts/purses, including the reimbursement purse, or call to obtain balances for all accounts through an interactive voice response, as well as view the balance through a mobile application or online portal.

Figure 2:
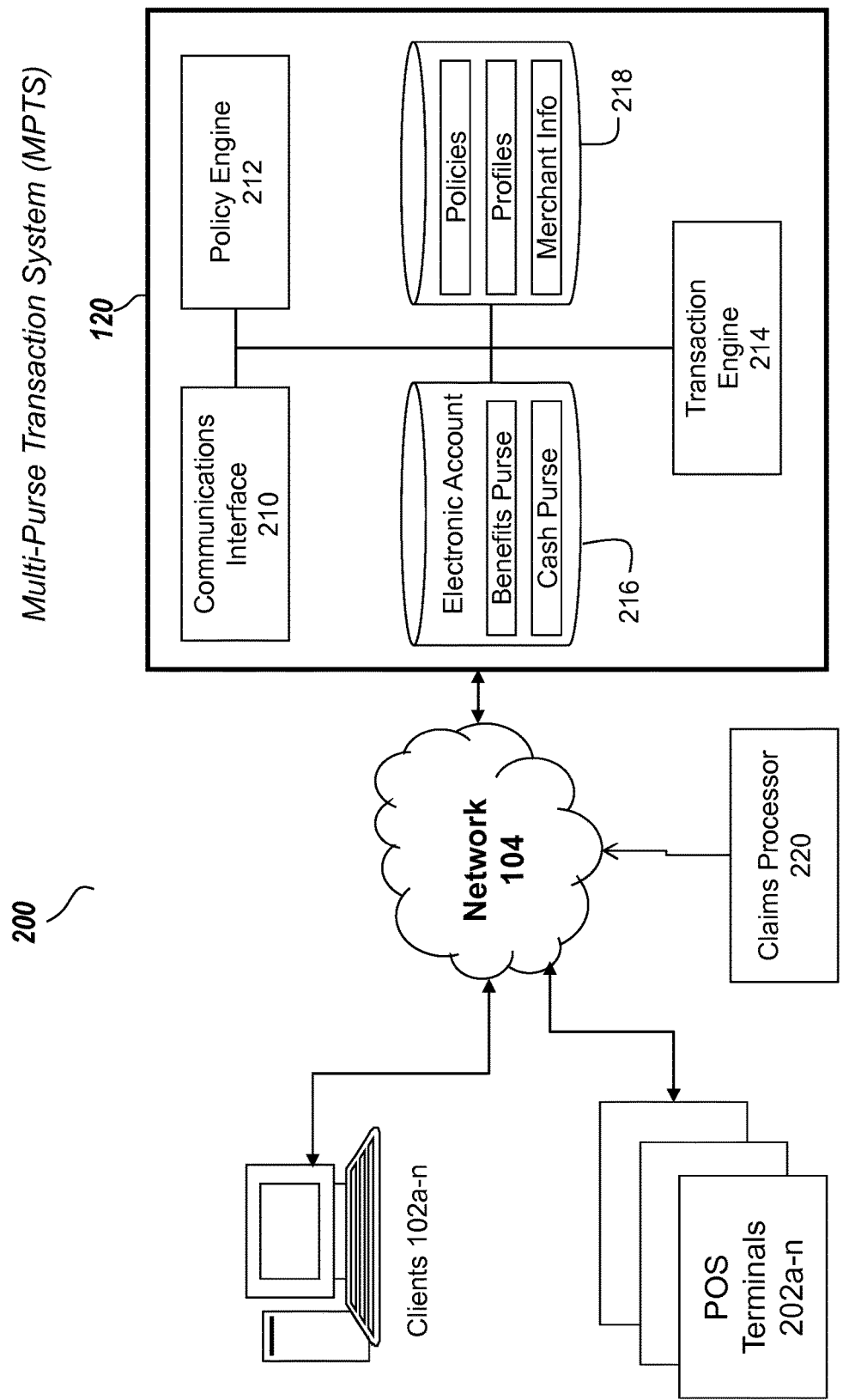
FIG. 2 is a block diagram depicting an embodiment of a system for conducting electronic transactions via a computer network.

Referring now to FIG. 2, a block diagram depicting an embodiment of a system 200 comprising a multi-purse transaction system (MPTS) is shown. In brief overview, the system 200 includes a multi-purse transaction system 120 ("MPTS") that can receive and/or transmit data via a network 104 with clients 102a-n and POS terminals 202a-n. The system 200 may include or interact with one or more clients 102a-n (or client device 102), and one or more point-of-sale (POS) terminals 202a-n (or POS terminal 202). The MPTS 120 can include a communications interface 210 that is configured with one or more communications ports, application programming interfaces, network protocols (e.g., TCP/IP), authentication protocols, or security protocols (e.g., SSL). The MPTS 120 can include a policy engine 212 that selects a purse of an electronic accounting including multiple purses to use to conduct a transaction. The MPTS 120 can include a transaction engine 214 that obtains funds from one or more accounts or purses and transfers the funds to one or more accounts or purses or merchants. The MPTS 120 can include one or more databases or data structure that store information to facilitate the systems and methods of the present solution, such as database 216 and database 218. The database 216 (or electronic account) can include an electronic account maintained or configured on the MPTS 120 that includes one or more purses, such as a benefits purse and a cash purse. The database 218 can include one or more policies in a policy repository, user profiles, or merchant information.

The system 120, communications interface 120, policy engine 212, and transaction engine 214 may each include one or more processing units or other logic devices such as programmable logic array engines, modules, or circuitry designed and constructed to facilitate managing security on a network infrastructure. The MPTS 120 can include the components 100 shown in FIG. 1C or FIG. 1D, or be configured to operate as a service in cloud 108. The MPTS can include or interact with one or more servers 106a-n and clients 102a-n.

In some embodiments, the MPTS 120 can employ a multitier architecture such as a client-server architecture in which presentation, application processing, and data management functions are logically or physically separated. The presentation tier, or front-end, can include the communications interface 210 that serves static content or dynamic content to be rendered by the client 102 (e.g., by a web browser executing on client 102). The presentation tier or web server 210 can interact or communicate with the application tier to obtain data to provide to the client 102 or POS terminals 202a-n. The application tier can include the policy engine 212 and transaction engine 214 that controls the system's functionality and performs additional processing or analysis on data. The application tier can interact with the data tier to obtain the transaction data. The data tier can include data persistence mechanisms (database servers, file shares, etc.) and the data access layer that encapsulates the persistence mechanisms and exposes the data. The data tier can include databases 216 and 218. The data tier can include an application programming interface (API) to the application tier. The databases 216 or 218 can include stored procedures (e.g., SQL statements) that perform tasks with respect to the stored data.

In further detail, and in some embodiments, the MPTS 120 includes a communications interface 210. The communications interface 210 can execute on one or more processors of a server. The communications interface 210 can include one or more communications ports and be configured with one or more network protocols. Communications ports may include, e.g., network ports, Ethernet ports, WAN ports, I/O ports, or software ports. The communication port may be configured with a network protocol such as Transport Layer Protocols such as TCP/IP or UDP that are configured to receive and process data packets received via a computer network. The port may include or be associated with an IP address of a host and a protocol type of the communication.

In some embodiments, the communications interface 210 can receive data packets. The data packets may be generated by a first device at a first merchant to conduct a first electronic transaction at the first merchant. The first device may refer to a POS terminal such as POS terminal 202a. A point of sale terminal 202 ("POS") is the place where a retail transaction is completed. The POS terminal 202 is the point at which a customer of the entity or merchant makes a payment to the merchant in exchange for goods or services. At the point of sale the merchant may calculate the amount owed by the customer and provide options for the customer to make payment. The merchant may also issue a receipt for the transaction.

The POS terminal 202 can include hardware and software. Merchants may utilize weighing scales, scanners, electronic and manual cash registers, EFTPOS terminals, touch screens and any other wide variety of hardware and software available for use with POS terminal 202. For example, a pharmacy can use software to customize the item or service sold when a customer has a special medication request.

The POS terminal 202 may include advanced features to cater to different functionality, such as inventory management, CRM, financials, warehousing, flexible spending account transactions, etc., all built into the POS software. The point of sale terminal 202 can be configured to conduct a transactions using a debit card, multipurse card, Bluetooth, near field communications, smartphone, smartwatch, mobile telecommunications computing device, wearable communications, RFID, etc.

The communications interface 210 can receive data packets generated by the POS Terminal 202a responsive to conducting an electronic transactions. The data packets may include header information and payload information. Multiple data packets may be strung together in a sequence. The header information may refer to TCP/IP headers that include fields such as source port, destination port, sequence number, acknowledgment number, window size, etc. The payload information of the data packet can include information related to the transaction, merchant, or customer. The system 120 can receive the data packet with header information and payload information and process the packets to obtain information for further processing. The payload may include data identifying a first merchant category of the first merchant, an electronic account, and a monetary amount of the electronic transaction.

The data packets can carry data identifying a merchant or merchant category of the merchant. In some embodiments, the data carried by the data packets include a merchant category code or identifier (e.g., dental, medical, etc.). In some embodiments, the data identified a merchant, and the system 120 determined a merchant category based on the identification of the merchant by, for example, using a merchant to merchant category mapping or lookup table stored in database 218.

The data packets (e.g., payload of the data packets) may further identify an electronic account maintained and configured on the server. The electronic account may be maintained and configured in a database 216. The electronic account may correspond to a user and have a unique identifier. The unique identifier may include numbers, letters, characters, symbols, etc. The electronic account can be associated with the customer making the transaction at the merchant. The POS terminal 202a may receive or determine the electronic account identifier via a card swipe or other communication technique employed at the POS terminal 202a, which the POS 202a may then convey to the system 120.

The communications interface 210 may further receive data packets (e.g., payload information) identifying a first monetary amount of the first electronic transaction. The monetary amount may be for the purchase of goods or services made at the merchant. The monetary amount of the transaction may refer to the amount of funds in consideration for goods or services obtained from the entity or merchant. The merchant or entity can refer to the entity at which a point-of-sale terminal or device used to make the transaction is located or with which the terminal is associated. The monetary amount may be in any currency (e.g., United States dollars) or units. The monetary amount may be further tied to a category, such as medical services.

In some embodiments, the POS terminal 202 can generate multiple data packets for a single transaction. The multiple data packets can each include a header and a payload. The header may indicate that the multiple data packets are to be grouped together for routing, transmission or processing purposes.

In some embodiments, the system 120 includes a policy engine 212. The policy engine 212 can execute on one or more processors of a server. The policy engine 212 may receive, retrieve, or otherwise obtain or access some or all of the data carried by the data packets. The policy engine 212 may receive, retrieve, or otherwise obtain or access a policies, such as policies stored in database 218. The policy engine 212 may apply the policy to the data to select a purse of the electronic account.

The policy engine 212 may use or apply a policy that includes one or more techniques, algorithms, heuristics, or procedures. The policy may include decision points and utilize parameters or criteria. The policy may be based on criteria or rules that are established by an administrator of the MPTS 120 or another entity. The policy may facilitate determining which purse of the multipurse electronic account to use to transfer funds.

In some embodiments, the policy may be based on a merchant category. The policy may be based on a merchant category code ("MCC"). The MCC may refer to a code (e.g., a four-digit number) that may be assigned to a business by an entity, such as a credit card company or the MPTS. This code may be used to classify the merchant by a business type, or type of goods or services provided.

For example, the policy may be: if merchant category corresponds to (or equals or maps to or is) medical, then use benefits purse. In another example, the policy may be: if merchant category corresponds to dental, then use benefits purse. In another example, the policy may be: if merchant category maps to qualified benefits category, then use benefits purse. In some embodiments, the electronic account may include a benefits purse that is preconfigured with merchant categories that map to qualified or approved categories, such as categories for funds exempt from payroll tax may be used to conduct a transaction.

In some embodiments, the policy may include multiple criteria. For example, the policy may include: if merchant category corresponds to (or equals or maps to or is) medical or dental or vision or parking, then use benefits purse. In some embodiments, the policy may be a negative policy. For example, the policy may include: if merchant category does not equal medical or dental or vision, then use cash purse. In some embodiments, the policy may include an action to take when the policy is not satisfied. For example, if merchant category corresponds to medical or dental or vision or parking, then use benefits purse; otherwise, use cash purse. In some embodiments, a single policy may include multiple policies. In some embodiments, the system 120 may use process multiple policies before identifying a policy that is satisfied.

In some embodiments, the policy engine 212 can select a sub-purse using the policy. The sub-purse may refer to a purse within a benefits purse. For example, the benefits purse may include multiple purses, such as an FSA purse, HRA purse, HAS purse, DCA purse, or Transport Purse. Thus, the policy engine 212 may use a policy that can select the benefits purse and a benefits sub-purse based on a merchant identifier or merchant category. For example, the policy may be: if merchant category corresponds to parking, then select Purse{Benefits}.SubPurse{Transport}.

In some embodiments, the policy engine 212 may use a policy that includes monetary amount thresholds. For example, a merchant category may correspond to an approved benefits purse. However, the approved benefits purse may include a threshold that limits a monetary amount of a transaction. For example, the benefits purse may be configured with a parking sub-purse with a monetary amount threshold. The monetary amount threshold may be for a time period, such as a month, quarter, year, week, or other time interval. For example, the transport or parking sub-purse may be approved for $200 per month for transactions made at merchants that correspond to merchant category transport or parking. Thus, the policy may include criteria such as merchant category, transaction amount, and time interval. For example: if merchant category corresponds to transport and if transaction amount less than or equal to approved transaction amount for time interval, then use transport sub-purse.

In some embodiments, the policy engine 212 can obtain funds for a single transaction at a merchant from multiple purses of the electronic account. For example, a benefits purse may be configured with a monetary amount limit or threshold for a merchant category. The policy engine may then determine, using the policy, to select the cash purse for the remaining monetary amount. For example, for a transaction of a first transaction amount made at a medical provider, the policy may include: if merchant category corresponds to medical, then select benefits purse for funds up to medical amount threshold; if transaction amount is greater than medical amount threshold, then select cash purse for remaining amount, where remaining amount is transaction amount minus medical amount threshold.

In some cases, where the amount thresholds are based on a time interval, the system 120 may determine the amount using historical transaction information stored in a database 216 or 218. For example, the electronic account 216 may include transaction information with time stamps for one or more purses. Similarly, profiles stored in database 218 may include a user's profile which may include transaction information.

Thus, and in some embodiments, the first policy may refer to one or more policies that are used to determine or select one or more purses from which funds are to be obtained or withdrawn to complete a transaction conducted at a merchant.

In some embodiments, the policy engine 212 may apply a second policy directed to additional factors after using a first policy. The policy engine 212 may select the second policy responsive to or based on the first policy. The second policy may be associated with a monetary amount, transaction amount, or reimbursement amount. The policy engine 212 may use the second policy to determine a reimbursement amount. The policy engine 212 may use a reimbursement policy. The reimbursement policy may be applied to the data that identifies the transaction amount, merchant category, and electronic account. The reimbursement policy may be selected based on an insurance policy tied to or associated with the electronic account. The electronic account may include a unique identifier that maps to or corresponds to a type of insurance policy or reimbursement policy. The reimbursement or insurance policy (e.g., second policy) may be established by an administrator of the system 120, an employer of the user/customer conducting the transaction, or another entity. Using this reimbursement policy, the policy engine 212 can determine a reimbursement amount. For example, if the transaction amount for the medical service was $100, the policy engine 212 may determine that 80% of the transaction is covered by insurance. The system 120 may initially deduct $100 from the benefits purse of the electronic account in accordance with the first policy. Thereafter, applying the second policy, the system 120 may determine to credit or reimburse the electronic account $80.

Responsive to determining the reimbursement amount, the policy engine 212 may further select a second purse of the electronic account for the reimbursement. The second purse may be different from the first purse. For example, the second purse may be a cash purse without the same restrictions as the benefits purse. The cash purse or reimbursement purse may be configured for use for any type of transaction, including, e.g., food or entertainment.

In some embodiments, the second policy refers to a policy the policy engine 212 may use to select a purse for the reimbursement amount that is different from the first purse selected using the first policy. For example, the first purse selected using the first policy may be a benefits purse that may have restrictions. The restrictions on the benefits purse may refer to restrictions on what types of goods or services funds in the benefits can be used. However, the electronic account may include an additional purse that may not be configured with such restrictions. The additional purse may be referred to as a reimbursement purse or cash purse. The cash purse can be stored on the electronic account in database 216.

The second policy used by the policy engine 212 and obtained from database 218 to determine a reimbursement amount may include rules, parameters, criteria or thresholds. For example, the reimbursement policy may include: if merchant category corresponds to medical, then reimburse 80% of transaction amount. In another example, the policy may include: if merchant category corresponds to medical, then reimburse 80% of transaction amount, but do not reimburse more than reimbursement limit. The reimbursement limit may be on a per transaction basis, or a time interval basis. For example, the reimbursement limit may refer to the maximum reimbursement amount for a time interval, such as a month, quarter, year or other time interval. The reimbursement limit may be a global limit across all benefits purses, or may be specific for each benefits subpurse (e.g., a first limit for HRA, a second limit for DCA, a third limit for FSA, etc.).

In some embodiments, the policy engine 212 may receive an indication from a claims processor 220 external to the system 120 via network 104. In some embodiments, the system 120 or policy engine 212 is configured with the claims processor 220 or configured to interface with the claims processor 220 via communications interface 210. The claims processor 220 may process an insurance claim to determine a reimbursement amount. The claims processor 220 may be configured to use one or more policies or rules to process the insurance claim and determine a reimbursement amount. The policies may be based on a type of insurance coverage associated with a user of the electronic account. The claims processor 220 may automatically receive the insurance claim responsive to a user conducting a transaction using the multipurse card connected with the electronic account. The claims processor 220 may obtain, via database 216 or 218, policies, profiles and merchant information to adjudicate the claim. The claims processor 220 may adjudicate the claim, determine a reimbursement amount, and provide an indication to the system 120 regarding the reimbursement amount. The indication may identify the electronic account, user identifier, time, original transaction amount, reimbursement policy, or reimbursement amount.

The system 120, upon receiving the indication of the reimbursement amount from the claims processor 220, may select a second policy to determine to which purse of the multipurse electronic account to transfer the reimbursement amount. The policy engine 212 may retrieve the second policy from the database 218. The second policy include, for example, the following: if transaction corresponds to reimbursement, then select cash purse of the electronic account. The cash purse may not have the same restrictions as the benefits purse.

The system 120 can include a transaction engine 214. The transaction engine 214 can receive information or instructions from the policy engine 212 regarding a transaction, and conduct the transaction. The transaction engine 214 may obtain merchant information from database 218 and electronic account information from 216 to perform the transaction. The transaction may include electronically transferring funds from a first account to a second account. The first account may be an electronic account, and the second account may be an account of a merchant (such as a financial account). In some cases, the transaction engine 214 can facilitate a transfer of funds between an electronic account of a claims processor 220 and the electronic account 216. The transaction engine 214 may receive account identifiers, transaction amounts, credentials, authentication information, etc. The transaction engine 214 may conduct the transaction via communications interface 210, thereby using the network protocols, security protocols and other components or interfaces provided by the communications interface 210.

In some embodiments, upon completing the transaction via the transaction engine 214, the system 120 may provide, via the communications interface 210, a real-time notification of the reimbursement amount to account holder of the electronic account including the cash purse that received the reimbursement amount. The communications interface 210 may be configured to provide the notification via an electronic mail protocol, Simple Messaging Service protocol, notification or prompt on a mobile telecommunications devices (e.g., a smartphone, tablet, smartwatch, wearable telecommunications device, laptop computer, desktop computer, etc.). The notification may be in real-time, which may refer to providing the notification soon after completion of the transaction (e.g., within 1 minute, within 5 minutes, within 30 seconds). In some embodiments, the notifications may include status information regarding the reimbursement transaction (e.g., processing reimbursement, reimbursement approved, reimbursement denied, reimbursement submitted for transfer, transferring reimbursement, or reimbursement complete).

In some embodiments, the system 120 (e.g., via communication interface 210), receives a request for account information from a client device 102 associated with an electronic account maintained or configured on the system 120. The request for information may include information about a balance of the electronic account, available purses, balance of an individual purse, status of a reimbursement, policies associated with purses, or transaction history. The request may further include authentication information or credentials associated with the request. The authentication information may include network security credentials, such as security certificates or tokens. The authentication information may further include a username, password, two-tier authentication information (e.g., date of birth, cell phone number, verification code sent via text message to cell phone number in profile associated with electronic account). The request may be from a client device such as a smartphone. The request may be sent using a text messaging protocol such as SMS. The system 120 may authenticate a request sent via SMS based on the cell phone number of the device sending the SMS request, and matching the cell phone number with corresponding number stored in profile in database 218 for the electronic account.

Responsive to authenticating or otherwise approving the request, the system 120 may access a data record in database 216 for the electronic account to generate a report with the requested information, or generate a standard report, or generate another preconfigured report. The report may identify the account holder information, available purses, benefits purses, reimbursement purse, subpurses, and available amounts for each purse. The report may further identify a transaction history for the electronic account or each subpurse thereof. The report may further identify or indicate if one or more purses have reached a maximum limit. The report may further include a forecast based on current/ previous transaction history that indicates whether the user may likely deplete available resources or exceed maximum limits based on current spending for a time interval.

Figure 3:
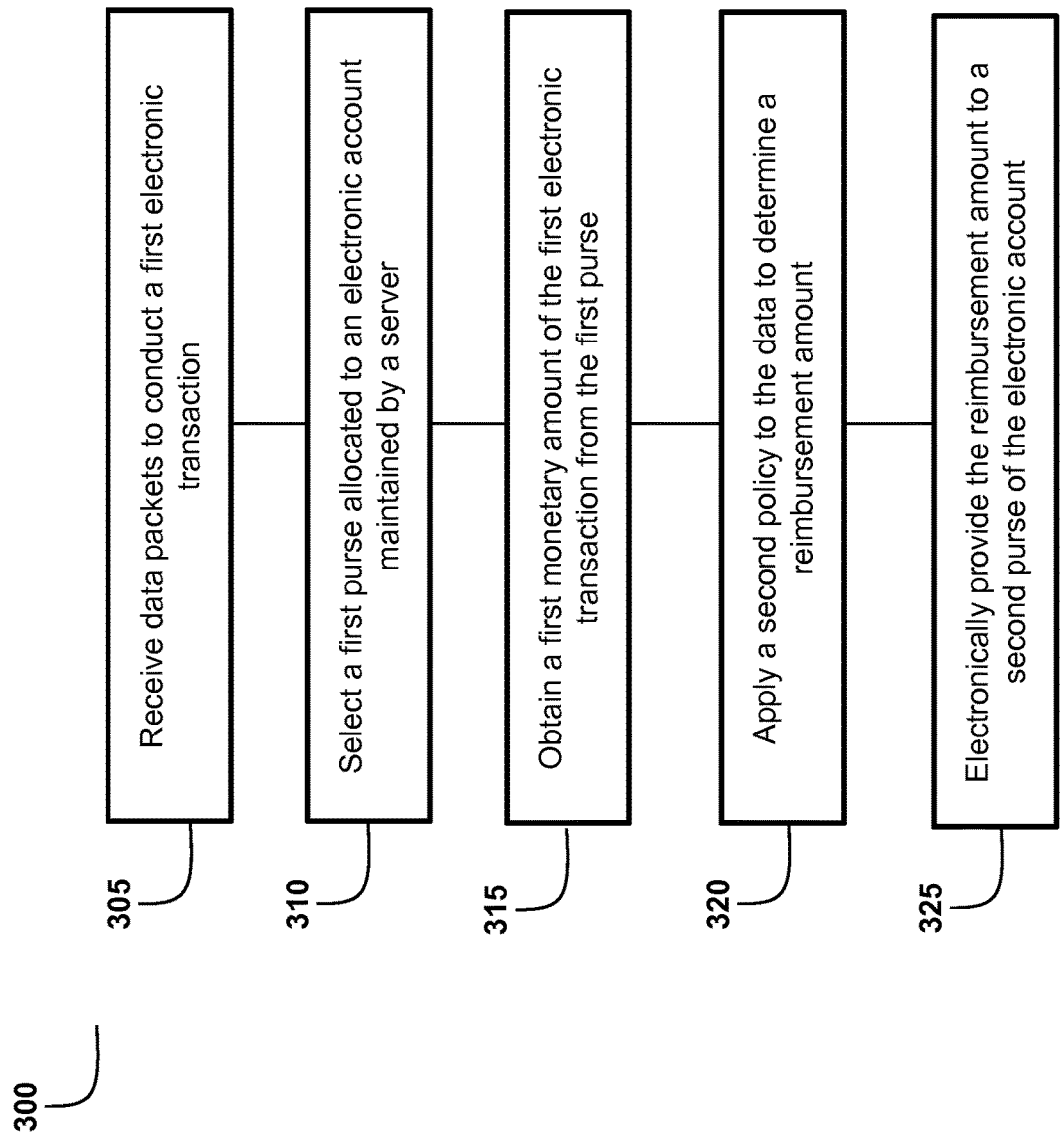
FIG. 3 is flow diagram depicting an embodiment of a method of conducting electronic transactions.

Referring now to FIG. 3, a flow diagram depicting an embodiment of a method of conducting an electronic transaction is shown. The method can be performed by system 200, MPTS 120, or one or more component thereof. In brief overview, at step 305, a server of a multipurse transaction system receives data packets to conduct a first electronic transaction. At step 310, the server selects a first purse allocated to an electronic account maintained by the server. At step 315, the server obtains a first monetary amount of the first electronic transaction from the first purse. At step 320, the server applies a second policy to the data to determine a reimbursement amount. At step 325, the server electronically provides the reimbursement amount to a second purse of the electronic account.

Still referring to FIG. 3, and in further detail, a server of a multipurse transaction system receives data packets to conduct a first electronic transaction at step 305. The data packets may be received via a computer network using a networking protocol. The data packets may be generated by a device at a merchant, such as a Point-of-Sale Terminal. The data packets may include header information and payload information. The header information may include, e.g., TCP header information that may facilitate the routing and transmission of the data packet. The payload information may include data related to, describing, defining, associated with or otherwise about the transaction occurring between the POS terminal, merchant, or customer.

The server can parse, process, or otherwise identify, from the header information or payload information from the one or more data packets, information about the transaction. The system can identify the first merchant (e.g., a name of a merchant, location of the merchant, unique identifier of the first merchant) or merchant category of the first merchant. In the event the data packets do not include a merchant category, the server may determine a merchant category based on a merchant identifier. In some embodiments, where the server fails to determine a merchant category, the server may default to using a cash purse that is approved for any time of transaction (e.g., where the merchant category in the data packets does not correspond to a policy in the policy repository). The data packets may also carry data (e.g., via payload information) identifying an electronic account maintained and configured on the server, and a monetary amount of the electronic transaction. The server may receive data packets for multiple transactions, where each transaction is associated with a merchant or merchant category and transaction amount. The data packets may further include (e.g., within the payload information) an electronic account associated with a multipurse card swiped at a POS of a merchant conducting the transaction. The multipurse card may be a plastic card (e.g., debit card or debit card with a magnetic strip or RFID), or be an electronic card stored on an telecommunications device which transmits an electronic account identifier corresponding to the electronic card via a wireless technology (e.g., Bluetooth, or NFC). The POS may generate or obtain information that allows the MPTS to conduct the transaction, encapsulate or process the information using a protocol to generate data packets, and transmit the data packets in a secure manner over a network to the MPTS for further processing.

At step 310, the server selects a first purse allocated to an electronic account maintained by the server. The electronic account may include several purses that are of different types or configured for different types of transactions, and the server may select the first purse using a policy. The server may retrieve the policy from a policy repository. The policy may include one or more rules, policies, parameters, criteria, comparisons, or thresholds. This first policy may refer to a policy used to select a purse for withdrawing funds to facilitate completing a transaction conducted a merchant. The policy may be used to select a purse having funds that can be allocated towards a purchase made at the merchant.

In some embodiments, the first policy may take into consideration factors such as merchant category and transaction amount. The first policy may select a purse based on the merchant category. The selected purse may be preconfigured or approved for purchases made at a merchant corresponding to a merchant category (e.g., prescription purchase made at a pharmacy may be approved to use funds from a benefits purse, such as a prescription purse). This purse may be configured as a purse with funds exempt from payroll tax deductions to be used to conduct approved transactions. For example, the server may determine that the first purse of the electronic purse is configured for prescription purchases, and select the first purse responsive to determining that the merchant is a prescription provider based on the first merchant category.

At step 315, the server obtains a first monetary amount of the first electronic transaction from the first purse of the electronic account. In some embodiments, the server may interface with a financial institution to conduct the transfer of funds. For example, the server may include an interface configured for conducting financial transactions over a network.

In some embodiments, the server may use the policy to determine the amount to obtain. For example, the amount to obtain from the first may be different from the transaction amount. The amount to obtain from the first may be less than the transaction amount. The amount to obtain from the first purse may be based on the policy. The policy may indicate that only a certain amount of the total transaction amount is approved to be deducted from the first purse. For example, the policy for a benefits purse such as a transport purse may limit the amount of funds that may be deducted during a time interval (e.g., $200 per month). Accordingly, the server may determine, by applying the first policy, to deduct a portion of the transaction amount from the first purse, and deduct a remaining portion from a different purse of the electronic account, such as a cash purse that may not include the same restriction. In some embodiments, the server may determine that there are not sufficient available funds in the first purse to complete the transaction (e.g., the transaction amount is greater than the available funds in the first purse that is configured as the benefits purse or an approved subpurse thereof). The server may then determine to deduct a remaining amount or the entire transaction amount from a cash purse or be configured with a credit card purse that may allow for a credit card transaction.

At step 320, the server applies a second policy to the data to determine a reimbursement amount. The second policy may refer to a policy that determines an amount of the transaction amount that is to be reimbursed to the electronic account. This second policy may be based on an insurance policy, claim policy, plan information, or benefits information. This second policy may include adjudication an insurance claim. In some embodiments, the MPTS may perform one or more component of the adjudication process or otherwise facilitate the adjudication process. In some embodiments, this claim processing may be done by the MPTS. In some embodiments, the claims processing may be performed in real-time (e.g., within 1 minute, 30 seconds, 5 minutes, 30 minutes of the claim being submitted). In some embodiments, the claims processing may be done by a third-party entity external to the MPTS. In some embodiments, the MPTS may receive an indication of the reimbursement amount, an account identifier with for the source of the funds to be reimbursement (e.g., a financial account of an insurance provider), and an account identifier or electronic account identifier or other user identifier corresponding to a destination for the funds to be reimbursed.

The second policy may include one or more policies that facilitate determining a reimbursement amount or a purse to which the reimbursement amount to be allocated. For example, the reimbursement policy may include: if prescription purchase at qualified merchant category, then reimbursement amount is 70% of the prescription amount. In some embodiments, the reimbursement amount may be an absolute value (e.g., $10, $50). In some embodiments, the reimbursement amount may include a function or formulate that takes into account the type of prescription or merchant category, a reimbursement rate, a type of insurance coverage, a geographic location, a cost of living factor, etc.

In some embodiments, the second policy may include a policy or factor that determines to which account to reimburse the funds. The second policy may select an account with fewer restrictions as compared to a benefits account. The second account may be configured with, in, on, or be part of the electronic account that includes a plurality of accounts maintained or configured on the server. The second account may be a cash purse or reimbursement purse of the electronic account. The second account may have no restrictions on where, when or for what the funds available in the second account can be used. In some embodiments, funds from the second account may be withdrawn as cash. In some embodiments, funds from the second account may not be withdrawn as cash, but may be used at any merchant that can conduct a transaction with the second account.

At step 325, the server electronically provides the reimbursement amount to a second purse of the electronic account. This second purse (or reimbursement purse or cash purse or restriction-free purse) may be different from the first purse, but maintained on or correspond to the same electronic account having the first purse or benefits purse. In some embodiments, the server provides a real-time notification of the reimbursement amount responsive to transferring the reimbursement amount to the first purse of the electronic account. The real-time notification may refer to providing the notification within a time interval of transferring the reimbursement amount to the second purse, or when the reimbursement amount is available for use or withdrawal via the second account. The time interval may refer to as soon as possible, 15 seconds, 30 seconds, 5 minutes, or some other time interval that notifies a user of available funds resulting from a reimbursement made to a purse of the electronic account soon after the funds are available.

In some embodiments, the server may receive one more data packets generated by a second device at a second merchant to conduct a second electronic transaction at the second merchant. The second device may refer to a different point of sale terminal, and the second merchant may be a merchant with a merchant category that does not correspond to a merchant category that is approved to receive funds for purchases from a benefits account. The second one or more data packets may include second header information and second payload information. The second payload information may include data associated with, defining, about or identifying aspects of the second transaction. The server may process the second one or more data packets to identify data from the payload information indicative of the second transaction. This payload information may include information such as a merchant identifier, merchant code, transaction amount, location, or electronic account information. In some embodiments, merchant category corresponds to an item being purchased in the transaction (e.g., soda purchased at a pharmacy). Thus, the merchant category of the transaction may not be approved to receive funds from a benefits account, although the merchant may provide other items that may be approved by the benefits account policy (e.g., prescription medications at a pharmacy vs. cigarettes sold at a pharmacy).

Along with these second data packets, the server may receive an identification of the electronic account, and a monetary amount of the second electronic transaction. The server may retrieve a second policy from a policy repository stored in memory using an identifier of the electronic account. The server may use the policy engine to apply the first policy to determine which purse of the electronic account to select for withdrawing funds to pay for the transaction. In some embodiments, the server determines, using a mapping of merchant category to purse configuration or purse policy, that the merchant category is not approved to receive funds from a benefits purse (e.g., the category may not correspond to any of the benefits subpurses, including medical, vision, dental, transport), and, instead, selects the cash purse for the transaction. The server may then instruct a transaction engine to obtain funds for this transaction from a cash purse that may not have restrictions based on merchant category or may be otherwise approved for providing funds for the transaction with the second merchant. For example, the server may select the second purse responsive to determining that the first purse is not configured for the second merchant category of the second merchant.

In some embodiments, merchant category may refer to a merchant category code ("MCC"). Table 1 is an example mapping of merchant categories to purses in accordance with an embodiment:

TABLE 1

Example mapping of merchant categories to purses in accordance with an embodiment.

| MCC | Merchant Category | Purse |
| --- | --- | --- |
| 8099 | Medical Services | Benefits Purse |
| 8062 | Hospitals | Benefits Purse |
| 8042 | Optometrists | Benefits Purse |
| 7832 | Motion Picture Theaters | Cash Purse |
| 7922 | Theatrical Ticket Agencies | Cash Purse |

For example, the server may analyze the amount of available funds in one or more purses of the electronic account in order to select one or more purses to conduct a transaction. For example, multiple purses may be approved or qualify for a transaction based on a merchant code (e.g., both a benefits purse and a cash purse). In some embodiments, a first purse may have a higher priority than a second purse, which may cause the server to select the first purse for funds prior to selecting the second purse.

If multiple accounts are approved based on a merchant category, the server may determine an available amount in each purse. For example, the server may access a data record in memory for the electronic account. The data record may indicate a first available amount and a first configuration for the first purse (e.g., as a benefits purse with $100), and a second available amount and a second configuration for the second purse (e.g., a cash purse with $500). The server may determine, based on the first available amount and the first configuration, to use the first purse for the first electronic transaction. For example, the first electronic transaction may be $100 for prescriptions medications. Further, the server may determine based on the first available amount and the first configuration, not to use the second purse for the first electronic transaction. For example, the first purse may have a higher priority because it has greater restrictions than the second purse, and the transaction parameters satisfies the policy and restrictions of the first purse.

Thereafter, the server may receive an indication of a second transaction. The server may receive a second one or more data packets with second header information and second payload information. The second payload information may include data about the second transaction. The server may parse or otherwise process the second one or more data packets to identify the second payload information and data about the second transaction. Using information about the second transaction, such as a merchant identifier, merchant code, or amount of the second transaction, the server may determine, based on the first configuration of the first purse, not to use the first purse for the second electronic transaction. For example, the second transaction may be for $30 for movie tickets which may not be approved for a benefits purse based on a MCC. Further, the server may determine, based on the second available amount and the second configuration, to use the second purse for the second electronic transaction. For example, the second purse may be a cash purse that is approved for any type of MCC, and the cash purse has sufficient funds for the transaction.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A system, comprising:
   one or more processors, coupled to memory, to:
   receive, from a first device of an entity external and remote from the one or more processors, via a secure network protocol established using encryption, a one or more data packets generated by the first device to conduct a first electronic transaction comprising a plurality of portions, the one or more data packets comprising: i) an identifier of a first category of transactions, ii) an identifier of an electronic account, and iii) an indication of a first amount of the first electronic transaction;
   identify, via the identifier of the electronic account, a preconfigured mapping of categories to a plurality of purses in the electronic account;
   select, to obtain funds from multiple purses as a single transaction via the secure network protocol established using the encryption for the first device, a first purse of the plurality of purses allocated to the electronic account based at least in part on the first category and the preconfigured mapping, the first purse configured to allow transfers of funds exempt from payroll tax deductions to be used to conduct approved transactions;
   conduct, via the secure network protocol and responsive to the selection of the first purse, a first portion of the plurality of portions of the first electronic transaction to transfer the first amount of the first electronic transaction from the first purse of the electronic account and provide the first amount to the entity;
   determine a reimbursement amount based on the first amount of the first electronic transaction that satisfies a threshold for a time interval established for the electronic account;
   select, responsive to the determination of the reimbursement amount for the time interval and based on the preconfigured mapping of the electronic account, for a second portion of the plurality of portions of the first electronic transaction, a second purse of the plurality of purses instead of the first purse for receipt of the reimbursement amount, the second purse configured to allow transfers of unrestricted funds that is different from the first purse from which the first amount is transferred to the entity;
   conduct, responsive to the selection of the second purse, the second portion of the first electronic transaction to transfer the reimbursement amount to the second purse with unrestricted funds; and
   transmit, responsive to completion of the first electronic transaction to transfer the funds with the multiple purses as the single transaction via the secure network protocol for the first device, and via at least one of a short message service ("SMS") protocol or an electronic message protocol, a notification to a client device linked to the electronic account that indicates transfer of the reimbursement amount to the second purse with unrestricted funds.

2. The system of claim 1, comprising:
the one or more processors to maintain the electronic account.

3. The system of claim 1, comprising the one or more processors to:
use a first policy to select the first purse based at least in part on the first category and the preconfigured mapping; and
use a second policy to determine the reimbursement amount based at least in part on the first amount of the first electronic transaction and the time interval.

4. The system of claim 3, wherein the second policy limits a total reimbursement amount for the first category within the time interval.

5. The system of claim 1, comprising:
the one or more processors to determine, responsive to a request from the client device associated with the electronic account, to transmit the notification pursuant to the first electronic transaction.

6. The system of claim 1, comprising the one or more processors to:
determine that the first purse of the electronic account is configured for prescription purchases; and
select the first purse responsive to a determination that the first category identified in the one or more data packets corresponds to a prescription purchase.

7. The system of claim 1, comprising the one or more processors to:
receive a second one or more data packets generated by a second device at a second entity to conduct a second electronic transaction at the second entity, the second one or more data packets comprising: i) an identifier of a second category, ii) the identifier of the electronic account, and iii) an indication of a second amount of the second electronic transaction;
determine, based at least in part on the second category, to use the second purse with unrestricted funds to conduct the second electronic transaction; and
conduct, responsive to the determination to use the second pursue, the second electronic transaction to transfer funds from the second purse to the second entity.

8. The system of claim 1, comprising the one or more processors to:
receive a second one or more data packets generated by a second device at a second entity to conduct a second electronic transaction at the second entity, the second one or more data packets comprising: i) an identifier of a second category, ii) the identifier of the electronic account, and iii) an indication of a second amount of the second electronic transaction;
select the first purse from which to obtain a first portion of the second amount of the second electronic transaction based on the second category corresponding to the first purse; and
select the second purse from which to obtain a second portion of the second amount based on an available balance in the first purse being less than the second amount of the second electronic transaction.

9. The system of claim 1, comprising the one or more processors to:

receive a request from the client device for information about the electronic account;
authenticate the request from the client device based on credentials associated with the request;
access a data record in memory for the electronic account, the data record comprising a first available amount for the first purse and a second available amount for the second purse; and
provide, for display on the client device, a notification that indicates the first available amount and the second available amount.

10. The system of claim 9, comprising:
the one or more processors to authenticate the request using a two-tier authentication.

11. A method, comprising:
receiving, by one or more processors coupled to memory, from a first device of an entity external and remote from the one or more processors, via a secure network protocol established using encryption, a one or more data packets generated by the first device to conduct a first electronic transaction comprising a plurality of portions, the one or more data packets comprising: i) an identifier of a first category of transactions, ii) an identifier of an electronic account, and iii) an indication of a first amount of the first electronic transaction;
identifying, by the one or more processors via the identifier of the electronic account, a preconfigured mapping of categories to a plurality of purses in the electronic account;
selecting, by the one or more processors, to obtain funds from multiple purses as a single transaction via the secure network protocol established using the encryption for the first device, a first purse of the plurality of purses allocated to the electronic account based at least in part on the first category and the preconfigured mapping, the first purse configured to allow transfers of funds exempt from payroll tax deductions to be used to conduct approved transactions;
conducting, by the one or more processors via the secure network protocol and responsive to the selection of the first purse, a first portion of the plurality of portions of the first electronic transaction to transfer the first amount of the first electronic transaction from the first purse of the electronic account and provide the first amount to the entity;
determining, by the one or more processors, a reimbursement amount based on the first amount of the first electronic transaction that satisfies a threshold for a time interval established for the electronic account;
selecting, by the one or more processors responsive to the determination of the reimbursement amount for the time interval and based on the preconfigured mapping of the electronic account, for a second portion of the plurality of portions of the first electronic transaction, a second purse of the plurality of purses instead of the first purse for receipt of the reimbursement amount, the second purse configured to allow transfers of unrestricted funds that is different from the first purse from which the first amount is transferred to the entity;
conducting, by the one or more processors responsive to the selection of the second purse, the second portion of the first electronic transaction to transfer the reimbursement amount to the second purse with unrestricted funds; and
transmitting, by the one or more processors, responsive to completion of the first electronic transaction to transfer the funds with the multiple purses as the single transaction via the secure network protocol for the first device, and via at least one of a short message service ("SMS") protocol or an electronic message protocol, a notification to a client device linked to the electronic account that indicates transfer of the reimbursement amount to the second purse with unrestricted funds.

12. The method of claim 11, comprising:
maintaining, by the one or more processors, the electronic account.

13. The method of claim 11, comprising:
using, by the one or more processors, a first policy to select the first purse based at least in part on the first category and the preconfigured mapping; and
using, by the one or more processors, a second policy to determine the reimbursement amount based at least in part on the first amount of the first electronic transaction and the time interval.

14. The method of claim 13, wherein the second policy limits a total reimbursement amount for the first category within the time interval.

15. The method of claim 11, comprising:
determining, by the one or more processors responsive to a request from the client device associated with the electronic account, to transmit the notification pursuant to the first electronic transaction.

16. The method of claim 11, comprising:
determining, by the one or more processors, that the first purse of the electronic account is configured for prescription purchases; and
selecting, by the one or more processors, the first purse responsive to a determination that the first category identified in the one or more data packets corresponds to a prescription purchase.

17. The method of claim 11, comprising:
receiving, by the one or more processors, a second one or more data packets generated by a second device at a second entity to conduct a second electronic transaction at the second entity, the second one or more data packets comprising: i) an identifier of a second category, ii) the identifier of the electronic account, and iii) an indication of a second amount of the second electronic transaction;
determining, by the one or more processors based at least in part on the second category, to use the second purse with unrestricted funds to conduct the second electronic transaction; and
conducting, by the one or more processors responsive to the determination to use the second pursue, the second electronic transaction to transfer funds from the second purse to the second entity.

18. The method of claim 11, comprising:
receiving, by the one or more processors, a second one or more data packets generated by a second device at a second entity to conduct a second electronic transaction at the second entity, the second one or more data packets comprising: i) an identifier of a second category, ii) the identifier of the electronic account, and iii) an indication of a second amount of the second electronic transaction;
selecting, by the one or more processors, the first purse from which to obtain a first portion of the second amount of the second electronic transaction based on the second category corresponding to the first purse; and
selecting, by the one or more processors, the second purse from which to obtain a second portion of the second amount based on an available balance in the first purse being less than the second amount of the second electronic transaction.

19. The method of claim 11, comprising:
receiving, by the one or more processors, a request from the client device for information about the electronic account;
authenticating, by the one or more processors, the request from the client device based on credentials associated with the request;
accessing, by the one or more processors, a data record in memory for the electronic account, the data record comprising a first available amount for the first purse and a second available amount for the second purse; and
providing, by the one or more processors for display on the client device, a notification that indicates the first available amount and the second available amount.

20. The method of claim 19, comprising:
authenticating, by the one or more processors, the request using a two-tier authentication.

* * * * *